United States Patent
Kirkpatrick

(10) Patent No.: US 7,062,512 B1
(45) Date of Patent: Jun. 13, 2006

(54) SYSTEM AND METHOD FOR PROCESSING IDENTIFICATION CODES

(75) Inventor: Ficus Kirkpatrick, Palo Alto, CA (US)

(73) Assignee: Danger, Inc., Palo Alto, CA (US)

( * ) Notice: Subject to any disclaimer, the term of this patent is extended or adjusted under 35 U.S.C. 154(b) by 128 days.

(21) Appl. No.: 10/260,155

(22) Filed: Sep. 27, 2002

(51) Int. Cl.
G06F 17/30 (2006.01)

(52) U.S. Cl. .................. 707/104.1; 707/3; 709/214

(58) Field of Classification Search .............. 707/1–10, 707/100–104.1; 709/213–216; 370/389
See application file for complete search history.

(56) References Cited

U.S. PATENT DOCUMENTS

| | | |
|---|---|---|
| 5,159,592 A | 10/1992 | Perkins |
| 5,559,800 A | 9/1996 | Mousseau et al. |
| 5,594,910 A | 1/1997 | Filepp et al. |
| 5,715,387 A | 2/1998 | Barnstijn et al. |
| 5,727,202 A | 3/1998 | Kucala |
| 5,778,176 A | 7/1998 | Geihs et al. |
| 5,790,974 A | 8/1998 | Tognazzini |
| 5,802,312 A | 9/1998 | Lazaridis et al. |
| 5,915,095 A | 6/1999 | Miskowiec |
| 5,961,590 A | 10/1999 | Mendez et al. |
| 5,964,830 A | 10/1999 | Durrett |
| 6,023,708 A | 2/2000 | Mendez et al. |
| 6,035,339 A | 3/2000 | Agraharam et al. |
| 6,076,109 A | 6/2000 | Kikinis |
| 6,151,677 A | 11/2000 | Walter et al. |
| 6,157,935 A | 12/2000 | Tran et al. |
| 6,166,734 A | 12/2000 | Nahi et al. |
| 6,167,441 A | 12/2000 | Himmel |
| 6,199,099 B1 | 3/2001 | Gershman et al. |
| 6,308,201 B1 * | 10/2001 | Pivowar et al. ............. 709/214 |
| 6,330,618 B1 | 12/2001 | Hawkins et al. |
| 6,370,687 B1 | 4/2002 | Shimura |
| 6,396,482 B1 | 5/2002 | Griffin et al. |

(Continued)

FOREIGN PATENT DOCUMENTS

WO    WO 98/36344    8/1998

(Continued)

OTHER PUBLICATIONS (L. R. Clausen, U. P. Schultz, C. Consel, and G. Muller. Java bytecode compression for embedded systems. Technical Report No. 1213, Institut de Recherche en Informatique et Systemes Aleatoires, 1998).*

(Continued)

*Primary Examiner*—Jeffrey Gaffin
*Assistant Examiner*—Yicun Wu
(74) *Attorney, Agent, or Firm*—Blakely, Sokoloff, Taylor & Zafman, LLP

(57) ABSTRACT

A method is described comprising: associating a plurality of data object types with a plurality of data object identification (ID) codes within a first database on a data service and within a second database on a wireless device; querying the second database on the wireless device to determine whether an associated object ID code exists for a first data object type; transmitting the object ID code from the wireless device to the service if the associated object ID code exists, responsive to the first data object type being employed by an application on the device; and transmitting a string representing the first data object type from the wireless device if no associated object ID code exists for the first data object type.

13 Claims, 4 Drawing Sheets

U.S. PATENT DOCUMENTS

| | | |
|---|---|---|
| 6,418,310 B1 | 7/2002 | Dent |
| 6,587,462 B1 * | 7/2003 | Mahalingaiah .............. 370/389 |
| 6,622,175 B1 | 9/2003 | Piller |
| 2003/0167230 A1 | 9/2003 | McCarthy |
| 2003/0181242 A1 | 9/2003 | Lee et al. |

FOREIGN PATENT DOCUMENTS

| | | |
|---|---|---|
| WO | WO 00/30003 | 5/2000 |

OTHER PUBLICATIONS

Excite Home Page, http://www.excite.com/, 1 page Aug. 1, 2000.

Alta Vista Home Page, http://www.altavista.com/, 1 Page Aug. 1, 2000.

Yahoo Home Page, http://www.yahoo.com/, 1 page Aug. 1, 2000.

Anita Komlodi, Key Frame Preview Techniques For Video Browsking, Digital Library Research Group, College of Library and Information Services University of Maryland, pp. 118-125.

Appenzeller, et al.., "User-friendly Access Control For Public Network Ports", IEEE, pp. 699-707, Mar. 1999.

* cited by examiner

| Data Object ID Codes (300) | Data Objects (301) |
|---|---|
| 00000000000000000 | apps.email.mailmessage |
| 00000000000000001 | tetris.highscore |
| 00000000000000010 | apps.news.newsmessage |
| 00000000000000011 | apps.web.browser |
| 00000000000000100 | apps.im.instantmessage |
| 00000000000000101 | pinball.highscore |

*Fig. 3*

SYSTEM AND METHOD FOR PROCESSING IDENTIFICATION CODES

BACKGROUND

1. Field of the Invention

This invention relates generally to the field of data processing systems. More particularly, the invention relates to an improved system and method for mapping and processing data object identification codes shared between a device and a service.

2. Description of the Related Art

A variety of wireless data processing devices have been introduced over the past several years. These include wireless personal digital assistants ("PDAs") such as the Palm® VIIx handheld, cellular phones equipped with data processing capabilities, and, more recently, corporate wireless messaging devices such as the Blackberry™ wireless pager developed by Research In Motion ("RIM").™

The wireless networks over which these data processing devices communicate typically allocate a relatively small amount of bandwidth per device. For example, Cellular Digital Packet Data ("CDPD") and ARDIS networks provide a data throughput of only 19.2 Kbps and the BellSouth Intelligent Wireless Network, which employs Mobitex technology, provides a data throughput of only 8 Kbps.

As such, data compression techniques are particularly important on these networks. One type of data compression replaces common character strings with relatively shorter code words. For example, the string "apps.email.mailmessage" may be replaced by an identification code which consumes substantially less bandwidth (e.g., a 16-bit or 32-bit identification code).

In order to use identification code words in this manner, however, the same ID code table must be maintained at both the originating end (e.g., a data processing device) and the receiving end (e.g., a client or server with which the data processing device is communicating). Maintaining up-to-date tables on hundreds or potentially thousands of data processing devices may be difficult, particularly when the character strings used on these devices may change over time. As such, what is needed is an improved system and method for maintaining synchronized ID code tables on data processing devices and the clients and/or servers with which they communicate.

SUMMARY

A method is described comprising: associating a plurality of data object types with a plurality of data object identification (ID) codes within a first database on a data service and within a second database on a wireless device; querying the second database on the wireless device to determine whether an associated object ID code exists for a first data object type; transmitting the object ID code from the wireless device to the service if the associated object ID code exists, responsive to the first data object type being employed by an application on the device; and transmitting a string representing the first data object type from the wireless device if no associated object ID code exists for the first data object type.

BRIEF DESCRIPTION OF THE DRAWINGS

A better understanding of the present invention can be obtained from the following detailed description in conjunction with the following drawings, in which:

FIG. 3 illustrates an exemplary identification codes.

DETAILED DESCRIPTION OF PREFERRED EMBODIMENTS

Described below is a system and method for processing code words. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Embodiments of a Data Processing Service

As described above, a variety of portable/wireless data processing devices are currently available. One particular wireless data processing device which operates in conjunction with a data processing service is described in co-pending application entitled NETWORK PORTAL SYSTEM, APPARATUS AND METHOD, Ser. No. 09/714,897, Filed Nov. 15, 2000 (hereinafter "Network Portal Application"), which is assigned to the assignee of the present application and which is incorporated herein by reference. Certain aspects of this data processing device and data processing service will now be described, followed by a detailed description of an advanced system and method for processing data object identification codes. It should be noted, however, that the underlying principles of the invention are not limited to the specific type of service set forth in the Network Portal Application.

Figure 1:
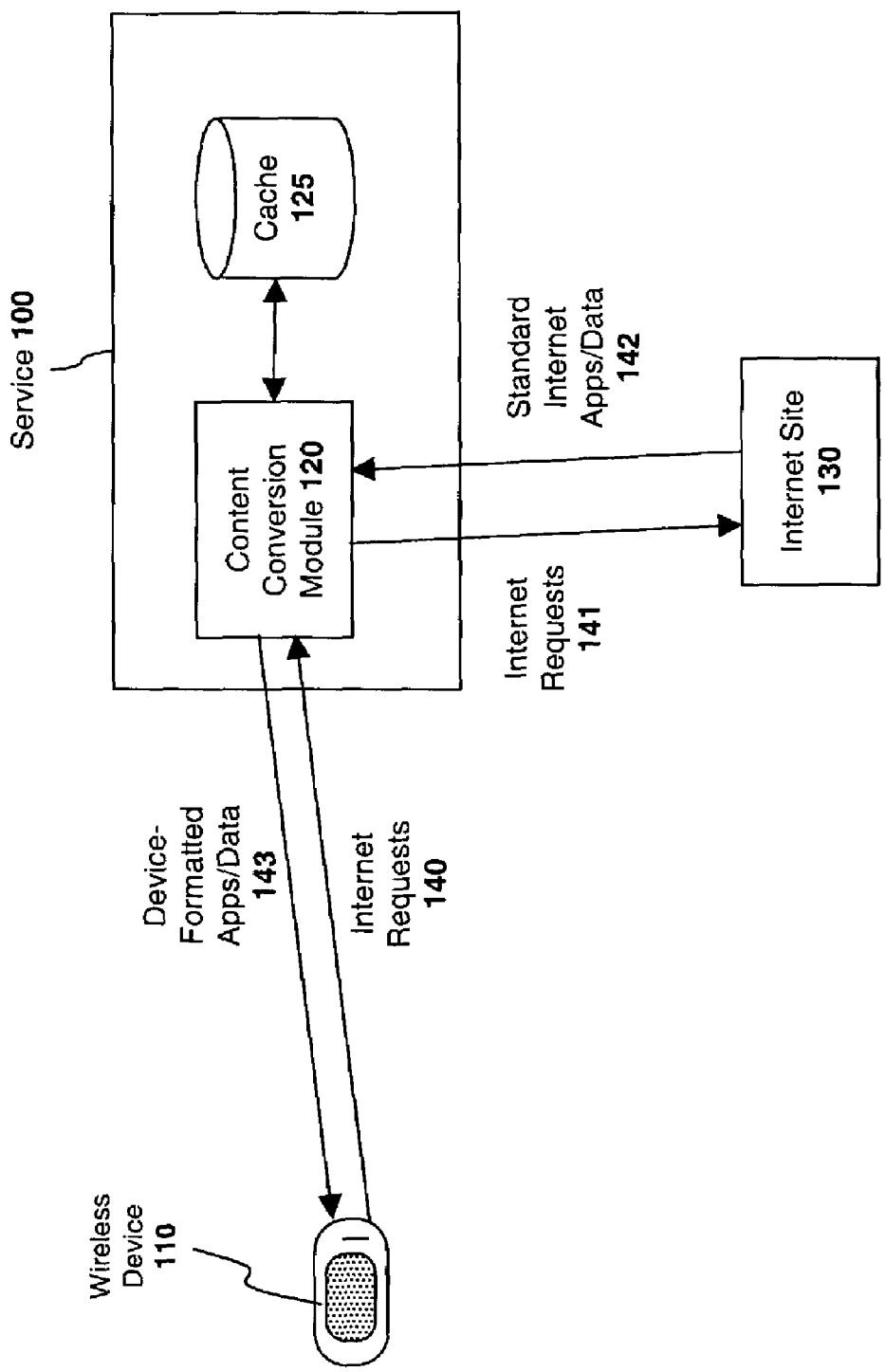
FIG. 1 illustrates one embodiment of a data processing service communicating with a data processing device.

FIG. 1 illustrates one embodiment of a data processing service 100 comprised of one or more servers. The data processing service provides a portal through which data processing devices 110 may access content (e.g., Web pages, multimedia content, e-mail, instant messages . . . etc) from external Internet sites 130. In one embodiment, the service 100 converts standard applications and data into a format which each wireless data processing device 110 can properly interpret. Thus, as illustrated in FIG. 1, one embodiment of the service 110 includes a content conversion module 120 for processing requests for Internet content 140. More particularly, the service 100 acts as a proxy for the data processing device 110, forwarding Internet requests 140, 141 to the appropriate Internet site 130 on behalf of the data processing device 110, receiving responses from the Internet site 130 in a standard Internet format (e.g., Web pages with embedded audio/video and graphical content, e-mail messages with attachments, . . . etc), and converting the standard Internet responses 142 into a format which the data processing device 110 can process (e.g., bytecodes as described in the Network Portal Application).

For example, the conversion module 120 may include a hypertext markup language ("HTML") rendering module (not shown) for interpreting HTML code and downloading any embedded content in the HTML code (e.g., graphics, video, sound, . . . etc) to the service 100. The conversion module 120 may then combine the HTML code and embedded content and generate a set of bytecodes for accurately reproducing the requested content on the data processing device 110. As described above, in one embodiment, the bytecodes may be Java bytecodes/applets. However, the conversion module 120 may generate various other types of interpreted and/or non-interpreted code, depending on the particular type of data processing device 110 being used (e.g., one with an interpreter module or one without).

Because one embodiment of the service 100 maintains an intimate knowledge of the capabilities/configuration of each data processing device 110 (e.g., screen size, graphics/audio capabilities, available memory, processing power, user preferences, . . . etc) it can reconstruct the requested Internet content accurately, while at the same time minimizing the bandwidth required to transmit the content to the device 110. For example, the conversion module 120 may perform pre-scaling and color depth adjustments to the requested content so that it will be rendered properly within the data processing device's 110's display. In making these calculations, the conversion may factor in the memory and processing power available on the data processing device 110. In addition, the conversion module 120 may compress the requested content using a variety of compression techniques, and thereby preserve network bandwidth.

In one embodiment, the conversion module 120 will simply discard Internet content which either cannot be reproduced on the data processing device 110, or which the user has indicated that he/she does not want to be reproduced on the wireless device. For example, a user may indicate that he/she does not want sounds to be generated on the data processing device 110 or that he/she does not want advertisements transmitted to the data processing device 110. The conversion module 120 will then remove any sounds or advertisements embedded in the requested Web page (or other requested Internet content). Because HTML rendering and other advanced processing of Internet content/data is offloaded to the service 100 as described above, the data processing device 110 can be manufactured using a relatively low power microprocessor or microcontroller, thereby lowering the cost of manufacture and/or the energy consumed by the device 110.

In one embodiment, when a particular Web page or other Internet object has been converted into a format suitable for rendering/execution on the data processing device 110 the formatted page/object may be stored locally on a cache 125 maintained at the service 100. The next time the content is requested, the conversion module 120 may simply read the previously-generated code from the local cache 125 (i.e., it will no longer need to retrieve the content from remote locations to reconstruct the code).

Various caching techniques and algorithms may be implemented to ensure that the cache 125 is storing Internet data efficiently (i.e., resulting in an acceptable percentage of cache 'hits') and that the data is current. For example, the service 100 may cache the most frequently-requested Internet data (e.g., the Yahoo™ home page), and may remove content from the cache based on a least-recently used caching policy. In addition, to ensure that data stored in the cache is current, the service 100 may compare the version of the data stored in the cache 125 with the version of data stored at the remote Internet site 130 when the data is requested. Similarly, the service 100 may store data in the cache 125 for some predetermined period of time before checking the remote server 130 for a new version. Various other Internet caching techniques may be employed while still complying with the underlying principles of the invention (e.g., those defined in the Internet Caching Protocol ("ICP") and/or the Cache Array Routing Protocol ("CARP")).

One embodiment of the data processing device 110 may support audio communications as well as (or in lieu of) data communications. In fact, the underlying principles of the invention are not limited to any particular type of wireless communication.

Object Identification Code Processing

Figure 2:
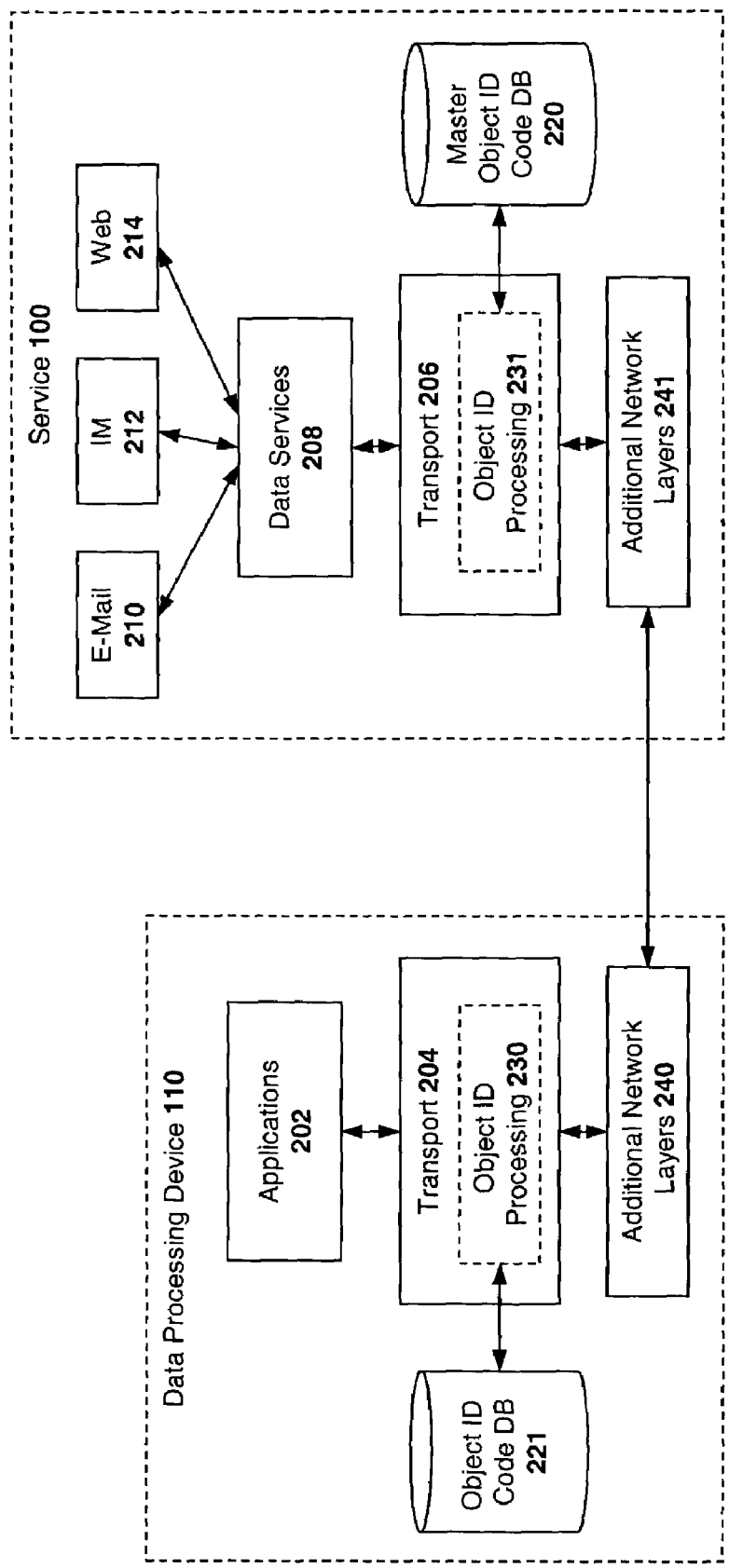
FIG. 2 illustrates a system for processing identification codes according to one embodiment of the invention.

One embodiment of a system for processing object identification codes is illustrated generally in FIG. 2. Both the data processing device 110 and the service 100 with which the data processing device communicates maintain object identification code databases, 221 and 220, respectively. When an application 202 executed on the data processing device employs a particular type of data object such as, for example, a new e-mail message, it identifies the data object type using a data object string (e.g., "apps.email.mailmessage"). The application 202 transmits the new e-mail message, or other data object, to the service 100 via a transport layer 204. In one embodiment of the invention, the transport layer 204 is comprised of an object ID code processing module 230 which performs a database lookup in the device's ID code database 221 to locate an identification code to represent the data object type.

One particular example of an ID code database 220 is illustrated in FIG. 3, in which a plurality of data object types 300 are represented by an equal plurality of 16-bit identification codes 301. If it is assumed that each character of the data object strings 300 is represented by 8 bits of data, a significant amount of bandwidth is saved using this coding scheme. For example, assuming 8 bits per character, the string "apps.email.mailmessage" requires 176 bits (22 characters×8 bits) or 22 bytes (176 bits/8 bits per byte) to encode, resulting in a bandwidth savings of 11:1 (i.e., 22 bytes/2 bytes per ID code). Of course, various alternate object ID code lengths may be employed while still complying with the underlying principles of the invention (e.g., 32 bits, 64 bits, . . . etc).

Once the ID code has been located, the transport layer 204 reliably transmits the ID code and the underlying data to the service 100 or, more specifically, to the service's transport layer 206. In one embodiment, the transport layer 204 packetizes the ID code and data provided by the application 202, embedding the ID code within the data packet header and the underlying data (e.g., e-mail message text) within the data packet body. Various transport mechanisms may be employed while still complying with the underlying principles of the invention including, by way of example but not limitation, the Transmission Control Protocol ("TCP") used for reliable communication over the Internet (i.e., the "TCP" in TCP/IP).

As indicated in FIG. 2, various additional network layers 240, 241 may be employed between the transport layers 204, 206 to support data transmissions between the device 110 and the service 100 including, for example, a physical/data-link layer and a network layer, as defined by the Open System Interconnection ("OSI") model developed by the International Standards Organization ("ISO"). The additional network layers 240, 241 may include those supported by packet-based wireless networks such as Cellular Digital Packet Data ("CDPD"), the General Packet Radio Service ("GPRS") and Mobitex. It should be noted, however, that the underlying principles of the invention are not limited to any particular type of network layers and/or protocols.

An object ID code processing module 231 executed with the service's transport layer 206 extracts the object ID code from the data transmission and uses the ID code to locate the object type in the ID code database 220. Once the object type is identified, in one embodiment of the invention, a data services module 208 then routes the underlying data to an appropriate data processing module (i.e., a module designed specifically to process the particular data type in question). For example, if the object type is a new e-mail message, then the underlying data is routed to an e-mail module 210 (e.g., an e-mail server), which processes the new e-mail message according to a specified e-mail message protocol (e.g., POP, IMAP, . . . etc). Similarly, the data services module 208 may forward instant messaging object types or Web-based object types to an instant messaging module 212 and a World Wide Web module 214, respectively, executed on the service 100. Of course, once the object type is identified by the transport layer 206, the service 100 may process the data object in a variety of ways while still complying with the underlying principles of the invention.

The foregoing encoding techniques work properly if both the data processing device 110 and the service 100 maintain synchronized ID code tables. If all applications executed on the device 110 are provided by the individuals and/or organization supporting the service 100, then maintaining consistent ID code tables may not be an overly complex task. Whenever a new application using new data object types is developed by the service 100, the service 100 may simply update all device ID code tables accordingly. However, if third parties are permitted to design applications, maintaining consistent ID code tables becomes more complex. One possible solution is for the service 100 to pre-allocate a block of ID codes for each third party application developer. However, tracking which ID codes are allocated to which third parties may require a significant amount of coordination and maintenance on the part of the service 100 operator.

Figure 4:
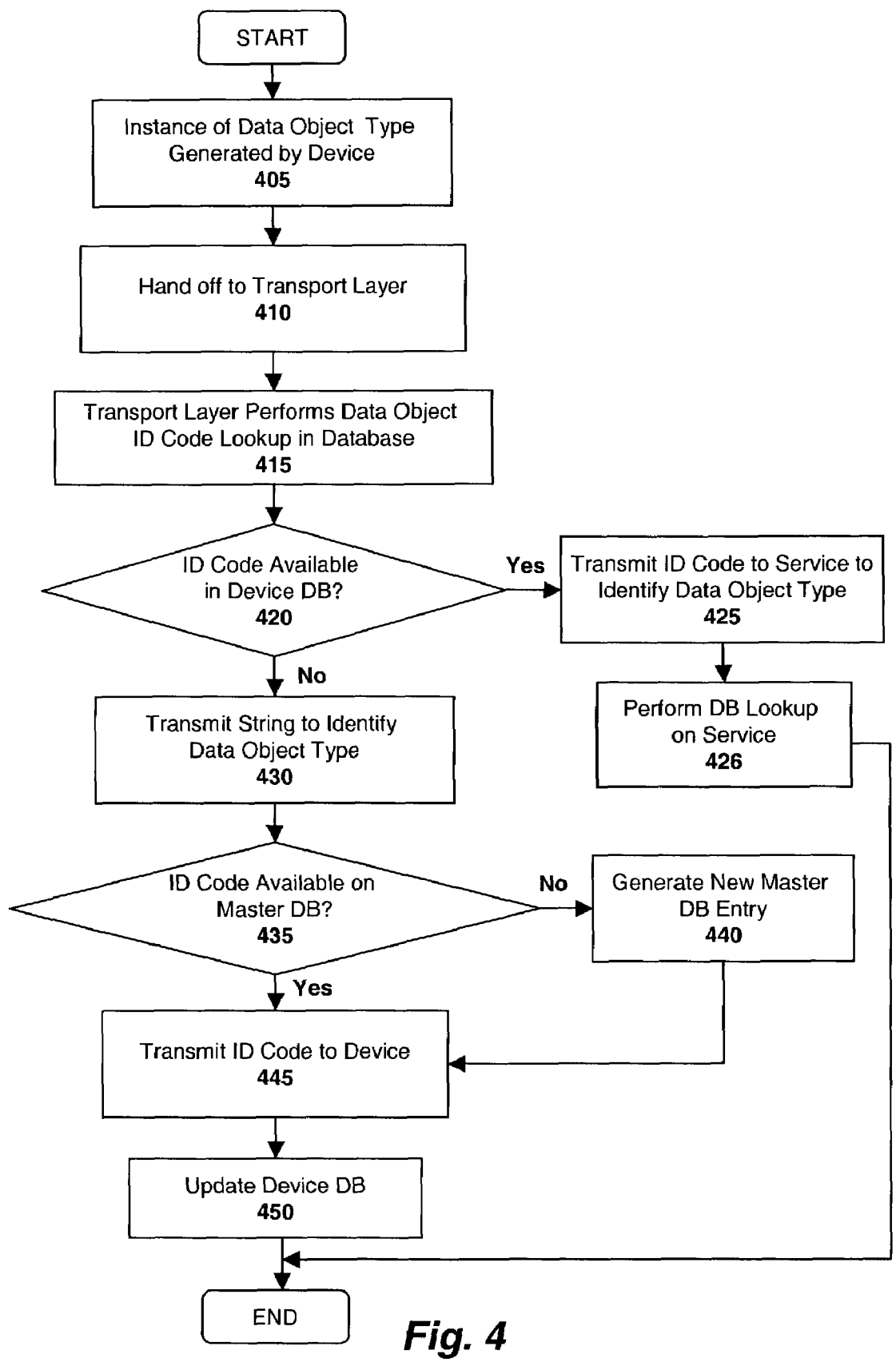
FIG. 4 illustrates a method for processing identification codes according to one embodiment of the invention.

One embodiment of a method for dynamically allocating ID codes is outlined in FIG. 4. At 405, an instance of a particular data object type is executed by the device 110. For example, the user may create a new e-mail message or instant message, or may be browsing a Web page. The underlying principles of the invention are not limited to any particular type of application or data object.

At 410, the data object is passed to the transport layer 204 for transmission to the data service 100. At 415, the transport layer 204 searches the ID code database 221 for an object ID code associated with the object to be transmitted to the service 100. If an ID code exists, determined at 420, then at 425, the ID code and underlying data are transmitted to the service 100 (e.g., as described above). The transport layer 206 on the service 100 subsequently uses the object ID code to identify the object type.

If, however, an ID code for the object does not exist in the ID code database 221 then, in one embodiment, the string identifying the object type (e.g., "apps.email.mailmessage") is transmitted to the service 100. An object ID code processing module 231 executed within the service's transport layer 206 queries the master ID code database 220 to determine if an object ID code exists for the data object. If one exists, determined by the ID processing module 231 at 435, then, at 445, the existing object ID code is transmitted to the device 110, which updates its object ID code database 221 accordingly. In one embodiment, the service 100 may transmit an entire copy of the master ID code database 220 to the device 110 (i.e., rather than one or more individual database entries). The decision as to whether to transmit an entire new copy of the master database 220 may be based on the extent to which the device's database 221 is out of date. For example, if the device's database 221 has not been updated for over a year, or if the device is communicating with the service 100 for the first time (e.g., because the user has just purchased or leased the device), updating the entire database 221 may be a more efficient solution.

At 435, if the ID processing module 231 determines that no object identification code exists for the data object type within the master ID code database 425 then, in one embodiment, the ID processing module 231 dynamically generates a new ID code for the new data object type. New object ID codes may be generated in a variety of ways including randomly, or consecutively, while still complying with the underlying principles of the invention. The new ID code may then be transmitted to the device at 445. In addition, any other devices which subsequently use the data object type may be updated by the service 100 with the new object ID code.

Using the dynamic ID code system and method set forth above, the device's ID code database 221 and the master ID code database 220 maintained on the service 100 are dynamically updated, without the need for manual intervention by a service operator. In addition, because the object ID code processing module 230 is employed within the transport layer 204, application programmers are not required to learn the nuances of the object ID code assignment process to build applications which will run on the wireless device 110, thereby simplifying application development for the device. Specifically, the applications programmers may simply refer to the data objects by the strings that represent them; the encoding process is then handled transparently within the transport layer 204.

If the data processing device 110 has an out of date object ID code database 221, it will not be able to identify certain object types using the object ID codes. Accordingly, in one embodiment, the service 100 is responsible for ensuring that the object ID code database 221 is up-to-date before initiating any transactions involving object ID codes.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media suitable for storing or transmitting electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, while the various ID code processing techniques were described above within the context of a network transport layer, the underlying principles of the invention may be employed at various other network layers, including the application layer. Moreover, while the embodiments described above focus on e-mail and instant messaging data objects, the underlying principles of the invention may be implemented using virtually any application or data object type. Accordingly, the scope and spirit of the invention should be judged in terms of the claims which follow.

What is claimed is:

1. A computer implemented method comprising:
    associating a plurality of data object types with a plurality of data object identification (ID) codes within a first database on a data service and within a second database on a wireless device, the data object types identifying a particular type of application code;
    querying said second database on said wireless device to determine whether an associated object ID code exists for a first data object type when said first data object type is employed by an application of said wireless device;
    transmitting said object ID code from said wireless device to said service if said associated object ID code exists, responsive to said first data object type being employed by an application, and querying said first database on said service using said associated object ID code to identify said first data object type on said service;
    transmitting a string representing said first data object type from said wireless device if no associated object ID code exists for said first data object type and querying said first database on said service using said string to locate an object ID code associated with said first data object type;
    generating a new object ID code and storing said new object ID code in said first database associated with said first data object type if said object ID code does not exist in said first database;
    transmitting said object ID code to said wireless device if said object ID code exists in said first database and creating a new database entry in said second database on said wireless device comprising said object ID code and said string representing said first data object type
    receiving a string representing said first data object type from a second wireless device;
    querying said first database on said service using said string to locate said object ID code associated with said first data object type; and
    transmitting said object ID code to said second wireless device.

2. The method as in claim 1 further comprising:
    uniquely processing said first data object based on said identified particular type of application code.

3. The method as in claim 2 wherein said particular type of application code is an e-mail message application and wherein uniquely processing comprises transmitting said e-mail message to an e-mail server.

4. A computer system comprising:
    a first database on a data service comprising a first plurality of data object types associated with a first plurality of data object identification (ID) codes, each of the first plurality of data object types identifying a particular type of application code;
    a second database on a wireless device comprising a second plurality of data object types associated with a second plurality of data object identification (ID) codes, each of the second plurality of data object types identifying a particular type of application code;
    an object ID processing module on said wireless device to determine whether an associated object ID code exists for a first data object type when said first data object type is employed by an application of said wireless device;
    said object ID processing module to transmit said object ID code from said wireless device to said service if said associated object ID code exists, responsive to said first data object type being employed by an application, or to transmit a string representing said first data object type from said wireless device if no associated object ID code exists for said first data object type;
    a service-based object ID processing module on said service to query said first database on said service using said associated object ID code to identify said first data object type on said service, if said associated data object ID code is transmitted from said wireless device;
    wherein if a string representing said first data object type is transmitted from said wireless device, said service-based object ID processing module queries said first database on said service using said string to locate an object ID code associated with said first data object type, wherein said service-based object ID processing module generates a new object ID code, associates said new object ID code with said first data object, and stores said new object ID code with said association in said first database if said object ID code does not exist in said first database;
    wherein if a string representing said first data object type is transmitted from said wireless device, said service-based object ID processing module transmits said object ID code to said wireless device if said object ID code exists in said first database;
    wherein said object ID processing module on said wireless device creates a new database entry in said second database on said wireless device comprising said object ID code and said string representing said first data object type; and
    wherein said service receives a string representing said first data object type from a second wireless device and wherein said service-based object ID processing module responsively queries said first database on said service using said string to locate said object ID code associated with said first data object type and transmits said object ID code to said second wireless device.

5. The system as in claim 4 wherein said service uniquely processes said first data object based on said identified particular type of application code.

6. The system as in claim 5 wherein said particular type of application code is an e-mail message application and wherein uniquely processing comprises transmitting said data e-mail message to an e-mail server.

7. The system as in claim 4 wherein said object ID processing module is executed within a network transport layer on said wireless device.

8. The system as in claim 7 wherein said service-based object ID processing module is executed within a network transport layer on said service.

9. The system as in claim 4 wherein said string comprises a series of ASCII-encoded characters.

10. A computer-implemented system for processing object ID codes on a wireless device comprising:
    an application layer comprising an application programming interface through which network applications are executed, said network applications employing one or more data object types, the data object types identifying a particular type of application code;

a transport layer to ensure reliable delivery of said data object types across a network to a data service, said transport layer comprising an object ID processing module to determine whether associated object ID codes exist for said data object types when said data object types are employed by an application of said wireless device;

said object ID processing module to transmit said object ID codes from said wireless device to said service if said associated object ID codes exist, or to transmit strings representing said data object types from said wireless device if no associated object ID codes exist for said data object types;

a transport layer at said data service to ensure reliable delivery of said data object types transmitted from said transport layer on said wireless device, said transport layer comprising a service-based object ID processing module to use said associated object ID codes to identify said data object types on said service, if said associated data object ID codes are transmitted from said wireless device;

wherein if a string representing a first data object type is transmitted from said wireless device, said service-based object ID processing module queries said first database on said service using said string to locate an object ID code associated with said first data object type;

wherein if said object ID code does not exist, said service-based object ID processing module generates a new object ID code, associates said new object ID code with said first data object, and stores said new object ID code with said association;

wherein if a string representing a first data object type is transmitted from said wireless device, said service-based object ID processing module transmits said object ID code to said wireless device if said object ID code exists in said first database;

wherein said object ID processing module on said wireless device creates a new entry in an object ID database on said wireless device comprising said object ID code and said string representing said first data object type; and wherein said service receives a string representing said first data object type from a second wireless device and wherein said service-based object ID processing module responsively locates said object ID code associated with said first data object type and transmits said object ID code to said second wireless device.

11. The system as in claim 10 wherein said service uniquely processes a first data object based on said identified particular type of application code.

12. The system as in claim 11 wherein said particular type of application code is an e-mail message application and wherein uniquely processing comprises transmitting said e-mail message to an e-mail server.

13. The system as in claim 10 wherein said strings comprise a series of ASCII-encoded characters.

* * * * *